July 18, 1944.   W. W. PATTISON   2,353,925
APPARATUS FOR FORMING ARCUATE BEARINGS
Filed May 18, 1942   10 Sheets-Sheet 1

INVENTOR.
WAYNE W. PATTISON
BY
ATTORNEYS

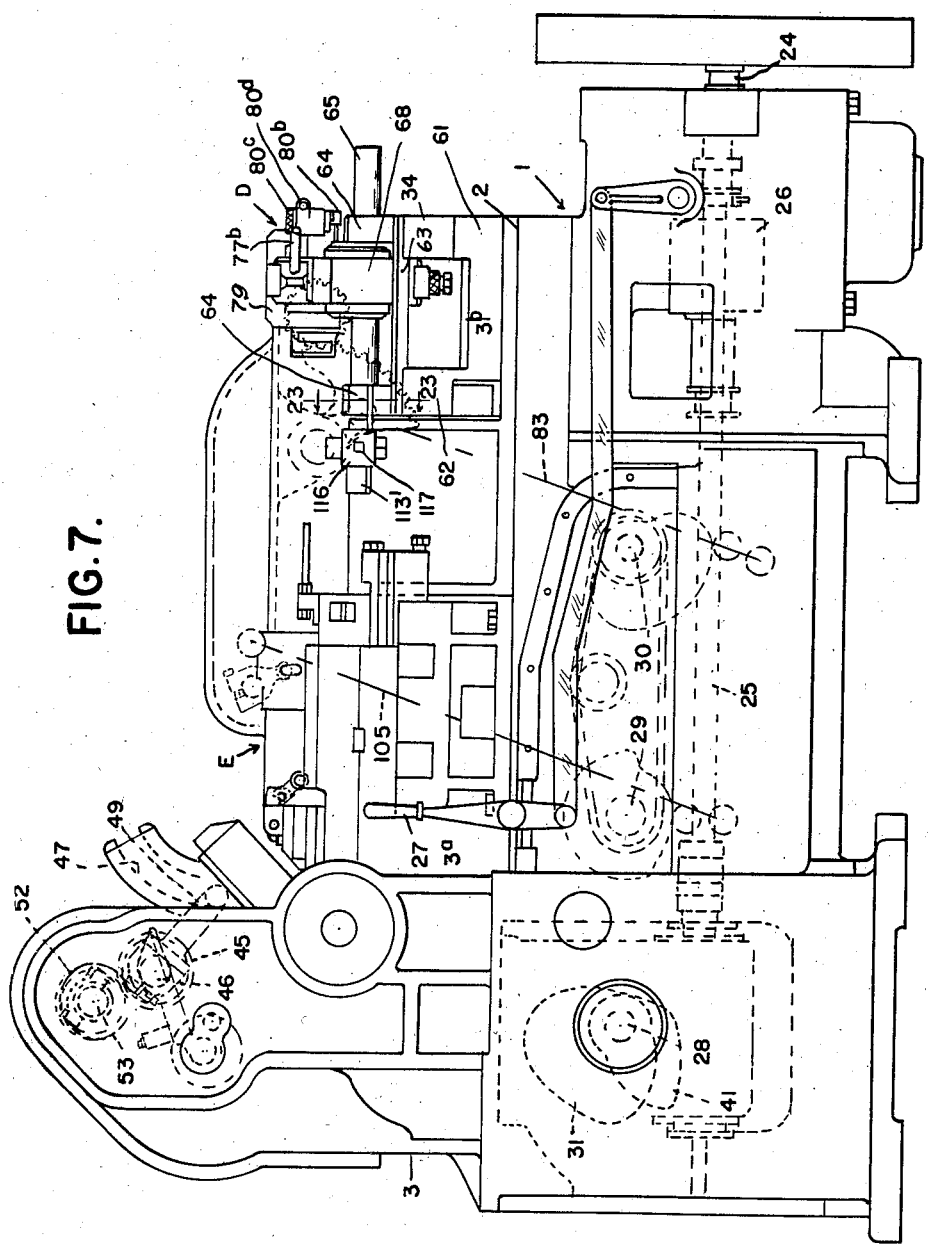

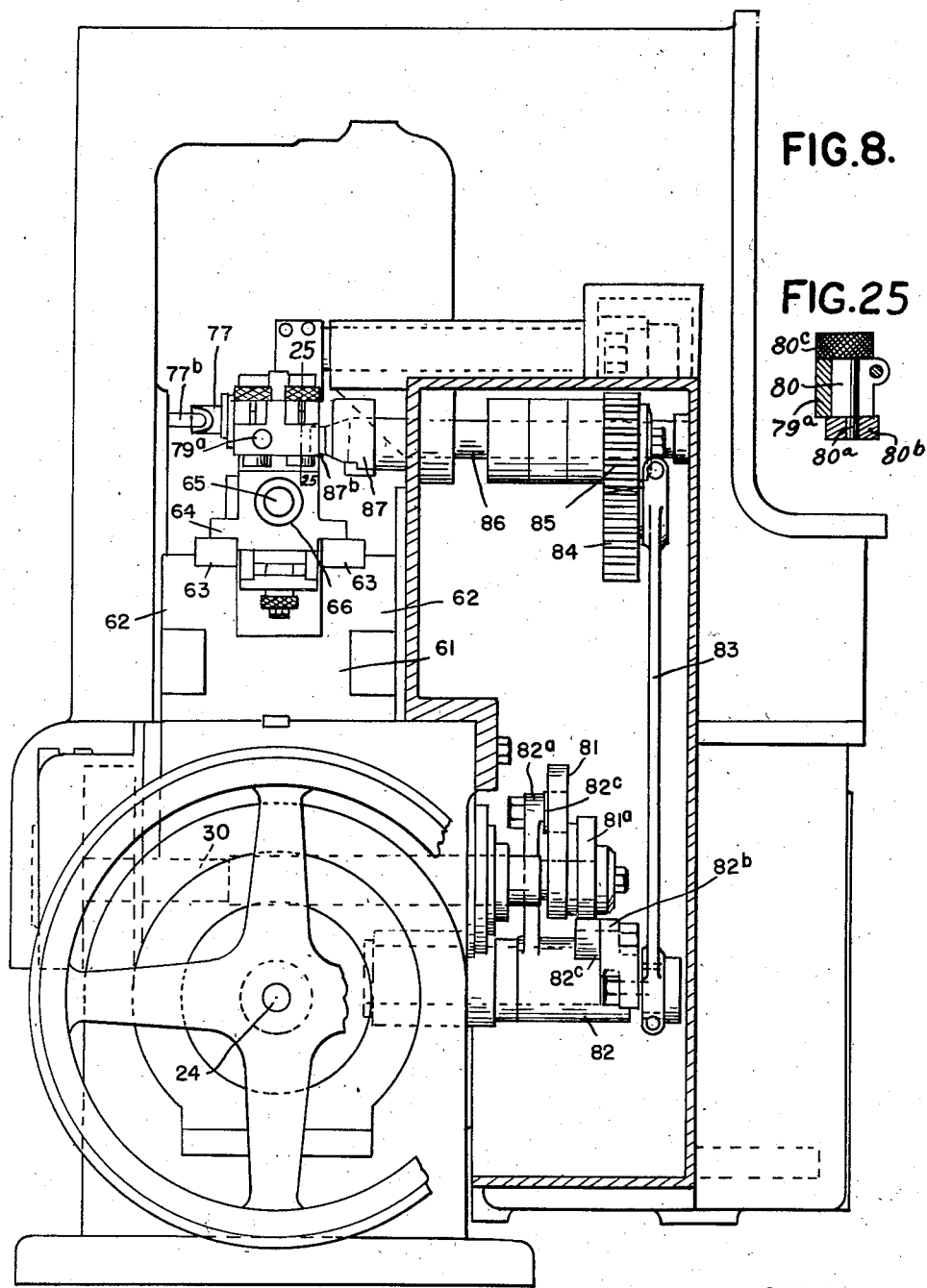

July 18, 1944.  W. W. PATTISON  2,353,925
APPARATUS FOR FORMING ARCUATE BEARINGS
Filed May 18, 1942  10 Sheets-Sheet 4

INVENTOR.
WAYNE W. PATTISON
BY
Whittemore Hulbert & Belknap
ATTORNEYS

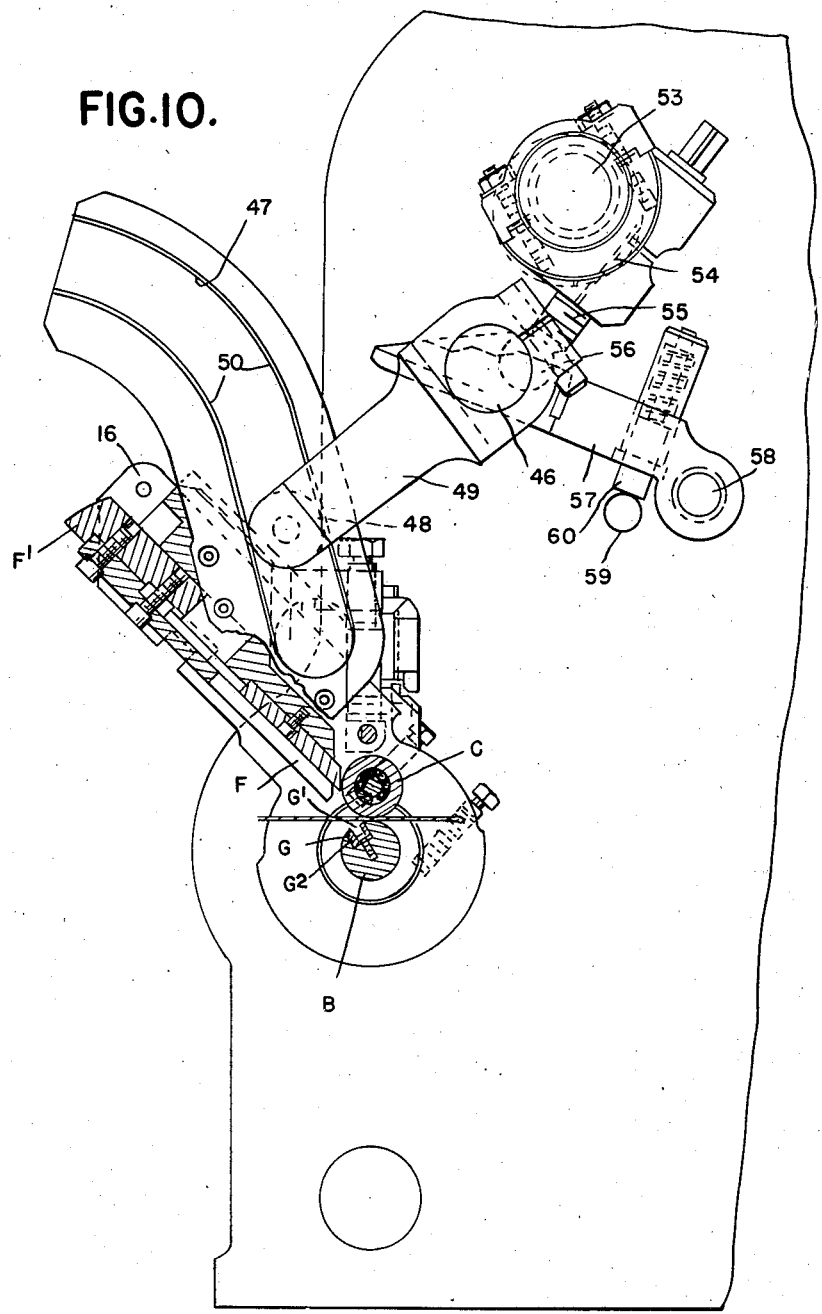

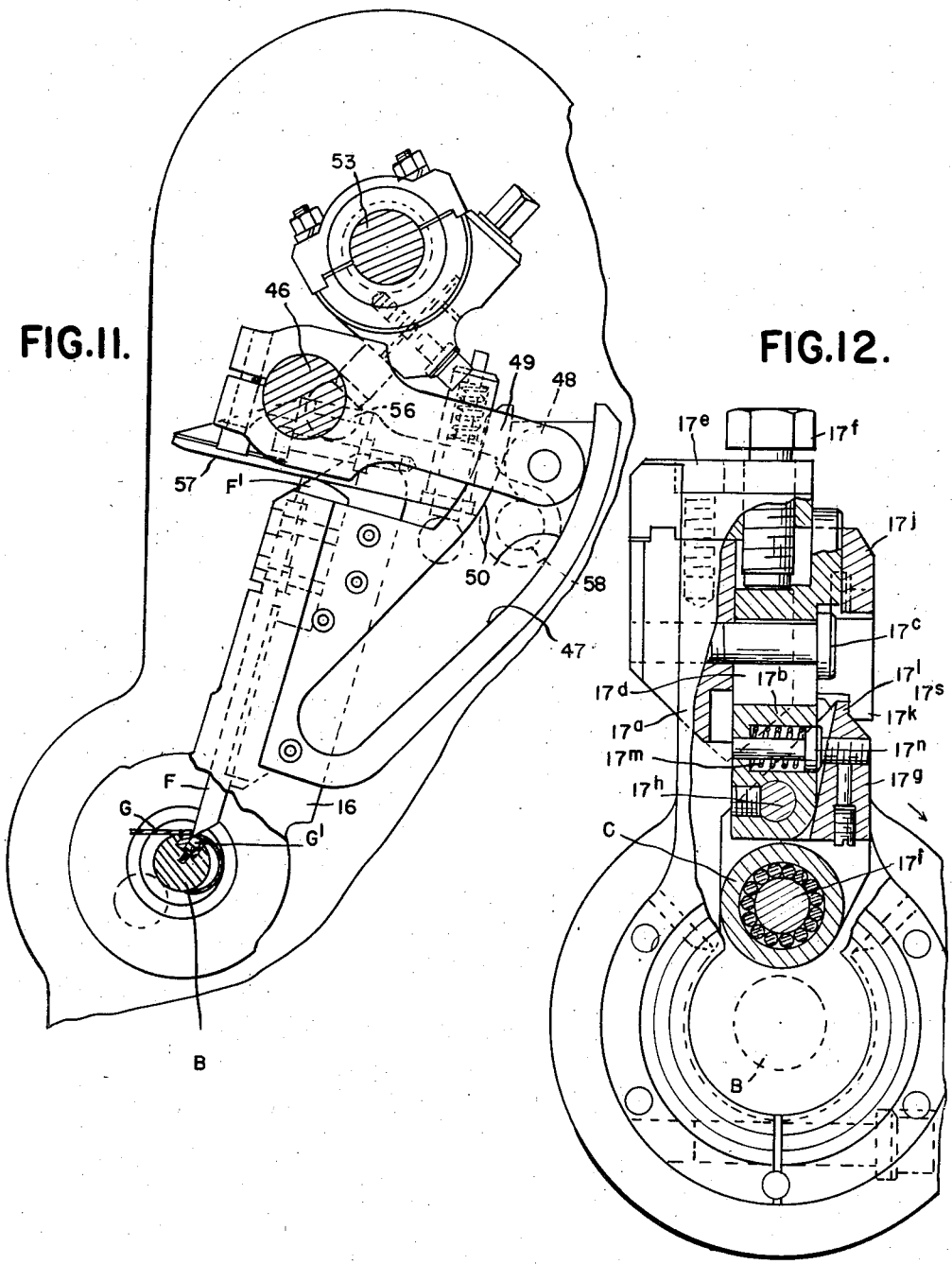

July 18, 1944.  W. W. PATTISON  2,353,925
APPARATUS FOR FORMING ARCUATE BEARINGS
Filed May 18, 1942  10 Sheets-Sheet 7

INVENTOR.
WAYNE W. PATTISON
BY
Whittemore Hulbert + Belknap
ATTORNEYS

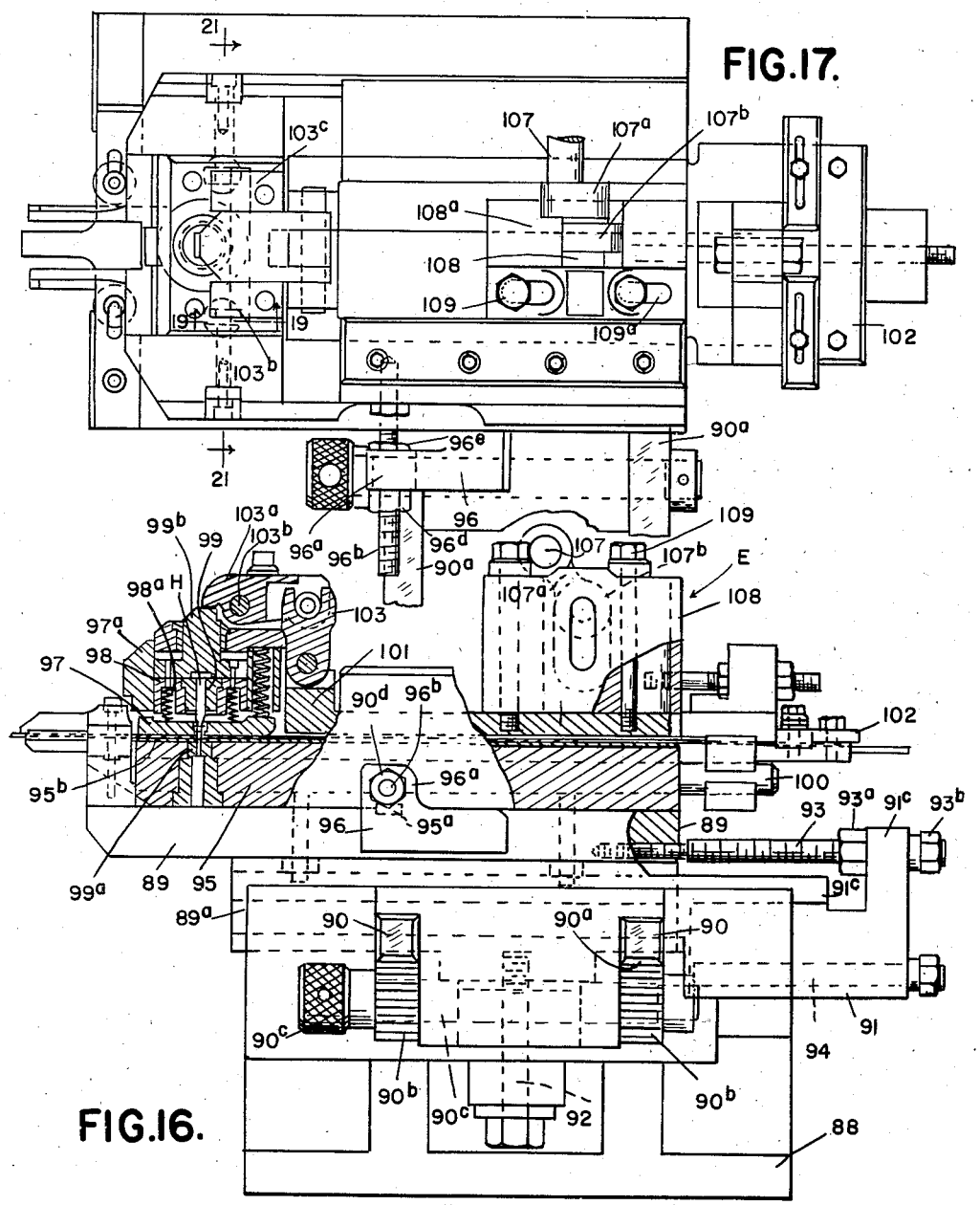

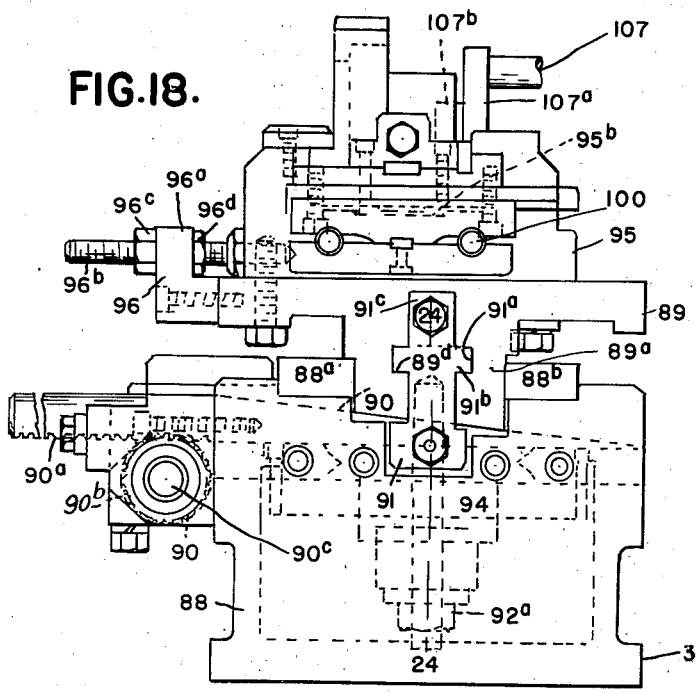

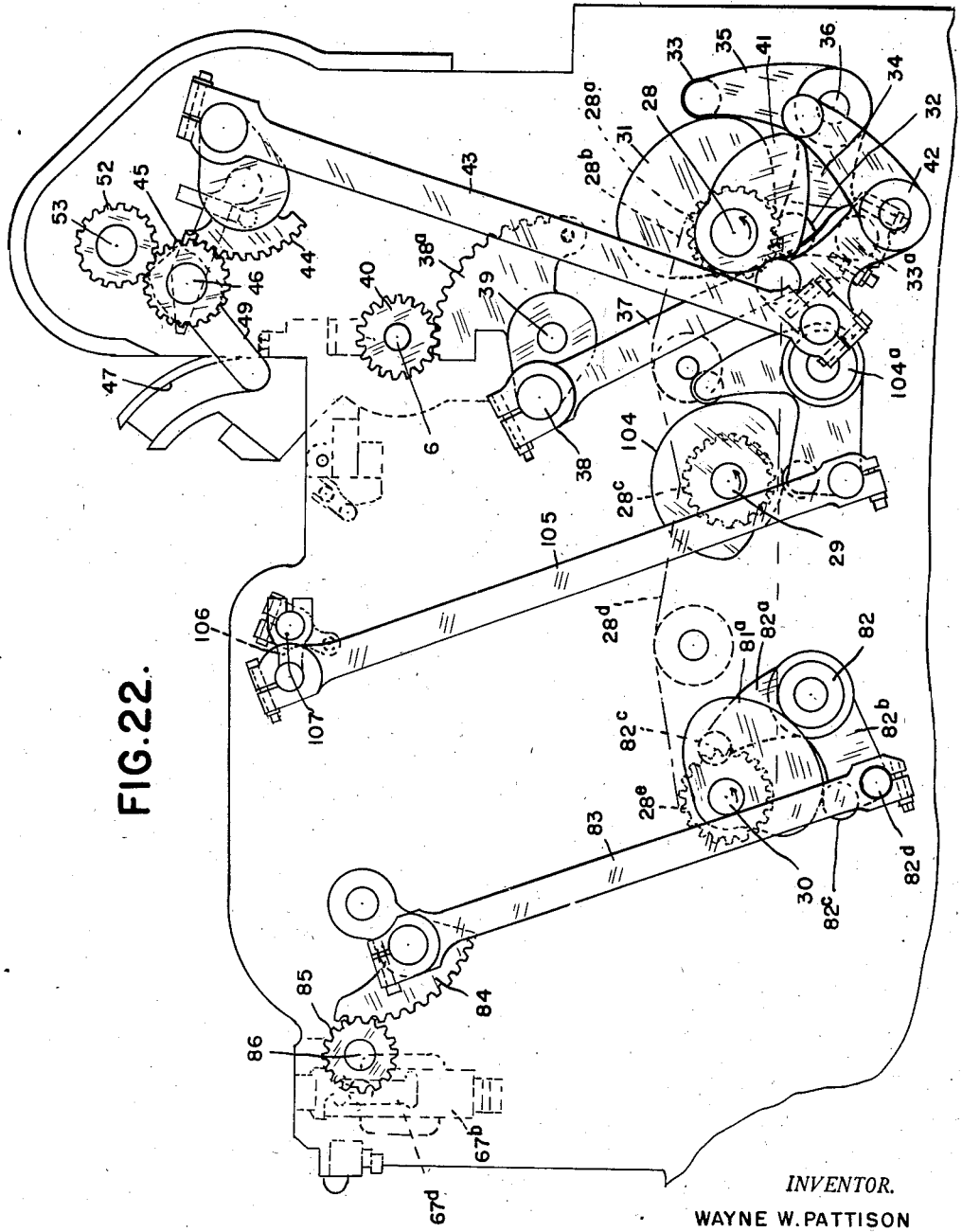

Patented July 18, 1944

2,353,925

UNITED STATES PATENT OFFICE 2,353,925

APPARATUS FOR FORMING ARCUATE BEARINGS

Wayne W. Pattison, Detroit, Mich., assignor to Bohn Aluminum & Brass Corporation, Detroit, Mich., a corporation of Michigan Application May 18, 1942, Serial No. 443,536

19 Claims. (Cl. 153—2)

The invention relates to the manufacture of arcuate bearings from composite flat strips of metal, one or both surfaces of said strips being provided with a thin coating of the bearing metal while the body of the strip is of a more rigid reinforcing metal, preferably steel.

Heretofore, said metal bearings and bearing shells have been formed by bending flat blanks into arcuate form. Such product is not, however, sufficiently accurate in form to be suitable for use without subsequent refashioning operations.

It is the primary object of the instant invention to form by a single operation arcuate bearings of such accuracy as to require no further reforming. To this end the invention consists in the process and the machine as hereinafter set forth.

In the drawings:

Figure 7 is a front elevation of the complete machine for forming bearings;

Figure 8 is an end elevation thereof;

Figure 10 is an enlarged sectional elevation of the severing mechanism viewed from the opposite side of Figure 7;

Figure 11 is a similar view showing the parts in a different position;

Figure 12 is a section through the rolling mechanism;

Figure 16 is a sectional elevation of the holding and piercing mechanism;

Figure 17 is a plan view thereof;

Figure 18 is an end elevation thereof;

Figure 19 is a section on line 19—19, Figure 17;

Figure 20 is a similar view with the parts in a different position of adjustment;

Figure 21 is a transverse section on line 21—21, Figure 17;

Figure 22 is a diagrammatic rear elevation of the machine;

Figure 24 is a section on the line 24—24, Figure 18;

Figure 25 is a section on the line 25—25, Figure 8.

The composite strip from which the bearings are to be formed preferably comprises a body A of steel and a thin layer A' of a suitable bearing material integrated with one face of this strip. To form the arcuate bearing a suitable length of such strip is bent about a mandrel, with the bearing face in contact therewith. However, in so bending the strip the outer circumference must be lengthened with respect to the inner circumference, which is of smaller radius, and this results in compression and stretching of the metal respectively on opposite sides of a neutral axis. The stresses thus produced and the inherent resiliency of the material will cause the bearings when released from pressure to spring away from the mandrel so as to not accurately conform to the shape thereof.

To overcome this difficulty, my improved process conforms the flat strip to the mandrel by a combined radially inward and circumferentially advancing pressure, which sufficiently elongates the outer face portion of the strip to compensate for its angular deflection. This relieves the inner bearing layer from objectionable stresses, and also accurately conforms it to the surface of the mandrel.

Figure 1:
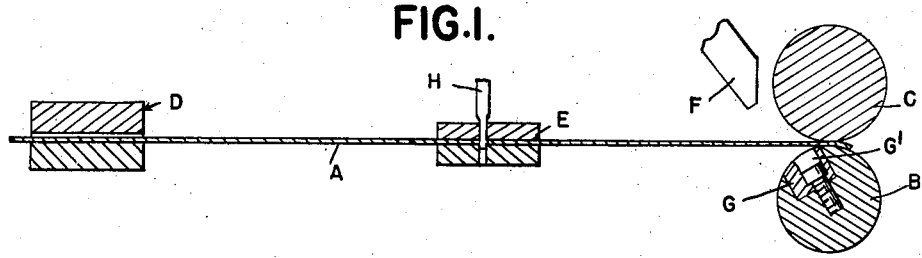
Figures 1, 2, 3 and 4 are diagrammatic longitudinal sections showing the successive steps in the rolling of a bearing.
Figure 2:
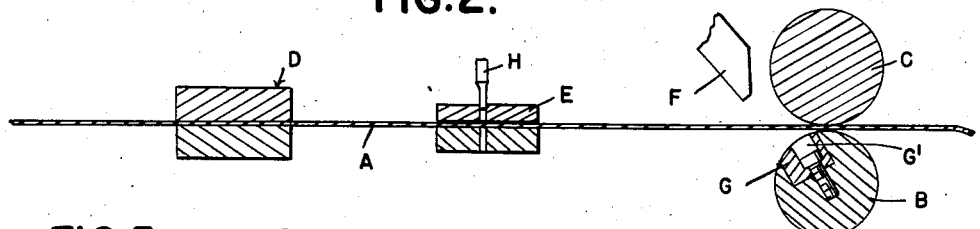
Figure 5:
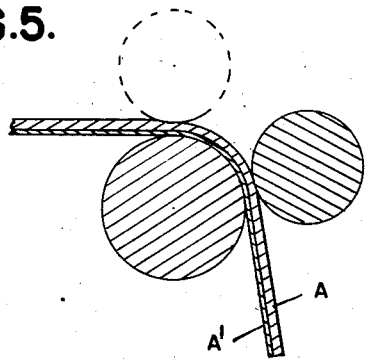
Figure 5 is a section showing the operation intermediate the steps in Figures 2 and 3.
Figure 3:
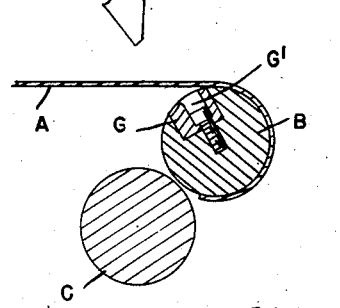
Figure 6:
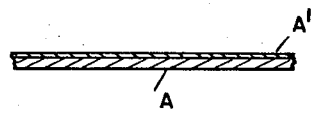
Figure 6 is a cross section through the flat strip from which the bearing is formed.
Figure 4:
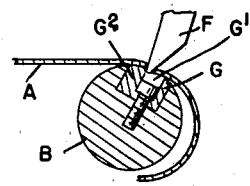

Generally described and as diagrammatically illustrated in Figures 1 to 5 of the drawings, my improved process is as follows: A suitable length of the strip A is fed over a mandrel B with the bearing layer A' in contact with the mandrel. A roller C is then pressed against the outer face of the strip and swung around concentric with the axis of the mandrel to conform the strip thereto. The radial pressure of the roller against the strip is sufficient to reduce the thickness thereof the required amount while the advancement of the roller around the mandrel will also displace the outer portion of the metal circumferentially, thereby producing the required increase in length. As shown in Figure 1, the strip A has its forward end portion in contact with the mandrel, while a portion in rear thereof is gripped by a feeder D. Figure 2 shows the strip advanced by the feeder between the mandrel B and roller C, and after such advancement it is rigidly held by clamping means E. In Figure 3 the roller C has been moved around the axis of the mandrel B to conform the strip thereto and to pass beyond the end of said strip. A shearing blade F positioned diametrically opposite the advanced end of the strip is then operated to sever the formed segment from the remainder of the strip. This completes the cycle, which is repeated to form successive bearings.

For accuracy, it is essential that the surface of the mandrel, about which the bearing is formed, should be uninterrupted. On the other hand, to cooperate with the shearing blade F an under shearing blade G is required, as well as clearance G' for the blade F to pass the same. This is accomplished by arranging the blade G and clearance G' on a portion of the mandrel which is not initially in contact with the strip, and after the strip has been conformed to the mandrel, the latter is rotated to bring these elements in proper position for severing (shown in Figure 4). The blade F is also preferably moved with the mandrel and the blade G so as to maintain proper cooperative relation thereto.

It is sometimes desired to perforate the strip for forming oil passages therethrough, or recesses for engagement with locating pins. This may be accomplished while the strip is held stationary in the clamping means E by the operation of a punch H located adjacent to said clamp.

Apparatus

An apparatus for carrying out the method as above described must be of such a character as to hold the cooperating elements in exactly predetermined relation to each other. This requires a rigid frame and substantial supports and bearings for the working elements. The essential elements of this apparatus are: First, a rigid mandrel holding means which is adapted to receive exchangeable mandrels corresponding to the different sizes of bearings that are to be formed. Second, a stock feeding means which advances the strip a predetermined amount in operative relation to the mandrel, and which is also adjustable to change the length of feed so as to correspond to the particular mandrel used. Third, a rolling mechanism which is adjustable into operative relation to the particular mandrel being used and which is held an exact radial distance from the axis of the mandrel while traveling about the same. Fourth, a cut-off mechanism which is adjustable in position so as not to interfere with the continuity of the surface of the mandrel during the rolling operation but which is subsequently moved to a position where it severs between rolled arcuate segments. Fifth, a clamping mechanism which holds the stock in rigid relation to the mandrel during the rolling operating. Sixth, a piercing mechanism associated with the clamping mechanism and which is adjustable to locate the pierced hole or holes in the stock so as to properly position the same in the completed rolled bearing. Seventh, a rigid frame on which the various mechanisms are mounted. Eighth, a driving mechanism which operates all of the mechanisms in properly timed relation to each other.

Supporting frame

As illustrated, I is the general frame which includes a table or bed portion 2 supported on suitable standards. Mounted on this bed are superframes 3, 3a, 3b, which respectively carry the mandrel mounting means and rolling mechanism, the clamping and piercing mechanisms, and the feed mechanism. The general frame carries the driving mechanism and the transmission between the same and the various operating mechanisms.

Mandrel supporting means

The frame 3 (Fig. 9) has two spaced and parallel vertically extending portions provided with axially aligned annular supporting bearings 4 and 5. Extending within the annular member 5 is a shaft 6 journaled in bearings 7 carried by a bushing 8. Within the annular supporting bearing 4 is a bushing 9 projecting a short distance into the space between the parallel frame members, and having at its outer end an annular flange 10 secured to the member 4 by tap bolts 11. A second bushing 12 is arranged within the bushing 9 and is free to rotate therein. This bushing 12 is adapted to receive a cylindrical portion 13 on each of a series of mandrels B, said cylindrical portion being of the same diameter for all the mandrels of various dimensions. The mandrel B has a tapering nose portion 15, which fits within a correspondingly shaped recessed bearing member 15a within a recess in the inner end of the shaft 6, thereby forming a rigid support for the mandrel at opposite ends thereof.

Rolling and cut-off mechanisms

Figure 9:
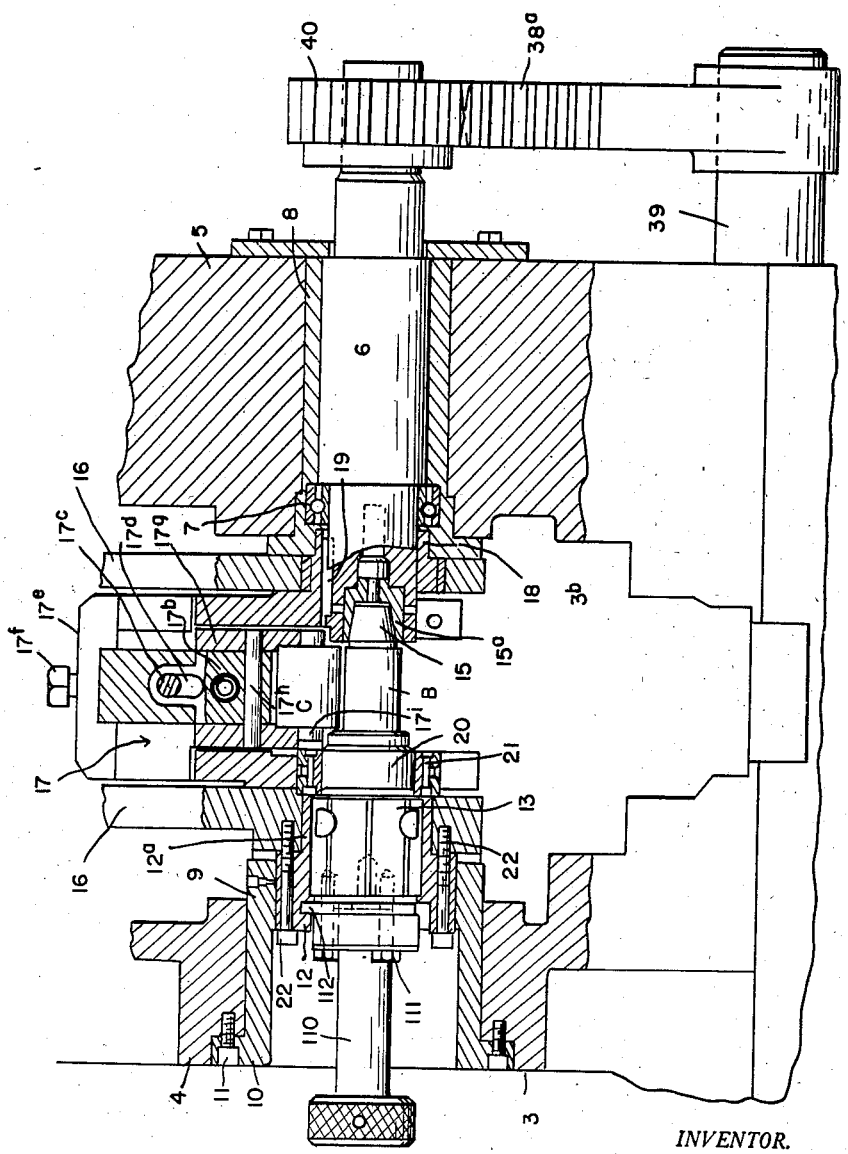
Figure 9 is a transverse section taken substantially in the plane of the axis of the mandrel and showing the rolling and severing mechanisms in connection therewith.

Positioned between the spaced portions of the frame 3 are arms 16 and 17, each having a bifurcated portion apertured for the passage of the mandrel B therethrough (Fig. 9). The bifurcated portion of the arm 16 embraces the bifurcated portion of the arm 17 and is in axial alignment therewith, while the outwardly extending portions of these arms normally lie adjacent to each other. The arm 17 has extending from one of its furcations the hub portion 18, which is of an internal diameter to fit upon the inwardly extending end portion of the shaft 6. It is also non-rotatably secured to said shaft by a key or spline 19. The opposite furcation of the arm 17 surrounds a cylindrical portion 20 of the mandrel B and is revolubly supported thereon through the medium of a roller or pin bearing 21. The arm 16, as previously stated, has the furcations thereof embracing or outside of the furcations of the arm 17. One of the furcations of the arm 16 is mounted on an inwardly projecting portion 12a of the bushing 12 and is secured to said bushing by a series of bolts 22 to form a trunnion revoluble in the bushing 9. The other furcation of the arm 16 is revolubly mounted on the hub 18 of the arm 17. Thus both of the arms 16 and 17 are held with their axes coincident with the axis of the mandrel B and are free to independently rotate about said axis. The arm 16 carries the shearing blade F, and the arm 17 the roller C.

It has been stated in the description of the method that the roller C is spaced from the mandrel B for the passage of the flat bearing strip A therebetween. Also that in operation the roller is pressed radially inward against the strip with sufficient force to thin the same, this resulting in displacement and circumferential flow of metal in the outer face portion of the strip as the latter is bent about the mandrel. Another feature previously described is the partial rotation of the mandrel between the operations of rolling the strip thereabout and the cutting off of the formed arcuate portion from the remainder of the strip. The purpose of this is to first provide on the mandrel an uninterrupted surface about which the strip is wound, and subsequently to rotate the mandrel so as to bring the shearing blade carried thereby beneath the formed arcuate portion of the strip. Thus when the rolling mechanism is functioning the mandrel is in the position shown in Figure 10.

Rolling mechanism

As mandrels of different diameters are used for the various sizes of the bearings, it is necessary that the roller C should be adjustable radially with respect to the axis of the mandrel. Such adjustment is also necessary for spacing the roller an exact amount from the surface of the mandrel so that in rolling it will thin and circumferentially elongate the outer surface portion of the strip, while conforming its inner surface to the mandrel. Such adjustments are provided for as follows:

The arm 17 (Fig. 12) has a rigid outer portion 17a integral with and cross-connecting the furcations thereof. Adjacent to this portion 17a is an adjustable block 17b which is normally held in rigid relation to said arm by a clamping bolt 17c passing through a slot 17d therein. A cap 17e is secured to the outer end of the arm and a screw 17f engaging a threaded bearing in this cap bears against the outer end of the block 17b and forms an adjustment means therefor. 17g is a member of U-shaped cross section having the opposite sides thereof embracing the block 17b and pivotally attached thereto by a pin 17h. The member 17g is also bifurcated at its lower end to embrace between the furcations thereof, the roller C. This roller is mounted, preferably by roller bearings, upon a pin 17i, the opposite ends of which are secured in said furcations. A plate 17j is adjustably secured to the arm 17 and has at its lower end a projecting finger 17k which overlaps an upwardly projecting finger 17b on the member 17g, said fingers limiting the rocking movement in one direction of the member 17g on the pin 17h. A spring 17m located in a recess in the block 17b bears against the head of a screw 17n, adjustably engaging the member 17g. This spring normally holds the fingers 17k and 17l in engagement but will yield to permit the rocking of the member 17g in a direction to separate said fingers. In other words it forms a latch construction which permits the roller C to release its pressure on the work when the arm 17 is returning after the rolling operation.

With the construction just described, it is evident that the roller C may be adjusted towards or from the axis of the mandrel by releasing the clamping screw 17c and adjusting the screw 17f to move the block 17b. This permits the operator to position the roller so that its periphery is spaced from the periphery of the mandrel just the distance required for the rolling of a particular bearing. After such adjustment the swinging of the arm 17 about the axis of the mandrel in a clockwise direction (Figure 12) will, as hereinafter explained, roll the strip about the mandrel, but the swinging of the arm in the opposite direction will permit the roller to move away from the mandrel. The arm 17 is actuated at the proper time by means that will be hereinafter described.

Cut-off mechanism

The cut-off mechanism (Figs. 10 and 11) is carried by the arm 16 together with the mandrel B which rotates therewith. As previously described, one of the furcations of the arm 16 is secured by bolts 22 to the bushing 12 which forms a trunnion rotatably engaging the bushing 9. The other furcation is revolubly mounted on the hub 18 of the arm 17. The shearing is effected by the cooperation of the blades F and G, the former being mounted on the arm 16 so as to be slidable thereon in radial direction. The blade G is formed by a hardened insert G² located in a groove in the mandrel, and the cutting edges of the two blades are held adjacent to a common plane on opposite sides thereof. The blade F is secured to a holder F' slidably mounted on the arm 16, and is actuated at the proper time by mechanism which will be now described.

Actuating means for the rolling and cut-off mechanisms

The power for driving the machine is furnished from any suitable source such as an electric motor, and is transmitted through suitable means to a shaft 24, running at reduced angular speed. In axial alignment with the shaft 24 is the main drive shaft 25 which is intermittently connected therewith through the operation of a clutch 26 controlled by a lever 27. The shaft 25 is connected through a speed reducing gearing of suitable construction (not shown) to a transversely extending shaft 28, and this shaft is connected by a sprocket 28a and chain 28b to a sprocket 28c on a parallelly arranged transverse shaft 29, and by a chain 28d to a sprocket 28e on a shaft 30, all of the shafts 28, 29 and 30 running at the same angular speed. The shaft 28 is used for operating the rolling and the cut-off mechanisms. The shaft 30 operates the feed mechanism, and the shaft 29 operates the clamping and piercing mechanisms.

The shaft 28 (Fig. 22) has mounted thereon a cam 31 which is engaged by rollers 32 and 33 on divergent arms 34 and 35 connected to a common rocker member 36. The cam is so fashioned that the rollers will always maintain peripheral contact therewith, and during a portion of the cycle the rolls will be traveling on concentric portions of the cam, so that no movement is imparted to the rocker member 36. The arm 35 has a crank pin 33a, and the latter is connected through the medium of a rod 37 with an eccentric pin 38 on a rockable sector gear 38a. This gear is revolubly mounted on a stud 39 on the frame 3 and is in mesh with a gear wheel 40 on the shaft 6. Thus at the proper time the shaft 6 is given a partial rotation to effect the rocking of the arm 17 about the mandrel, and to thereby effect the rolling operation.

Actuating means for the cut-off mechanism

In addition to the cam 31 (Fig. 22), there is mounted on the shaft 28 a cam 41, which actuates a rocker 42 connected by a rod 43 with a sector gear 44, in mesh with a gear wheel 45 on a shaft 46. The sector gear 44, gear wheel 45, and shaft 46 are all mounted on the frame 3, and the shaft extends into proximity in the plane of movement of the arm 16. This arm has secured thereto and projecting outward therefrom a grooved cam track 47 which is engaged by a roller 48 on the outer end of a crank arm 49 mounted on the shaft 46. The amount of angular movement imparted to the arm 16 through the medium of the crank arm 49 and cam track 47 is sufficient to shift said arm 16 from its normal position shown in Figure 10 to the position shown in Figure 11, where the cutting off is performed.

The cam track 47 has at its outer end an arcuate portion 50 which in the last named position of the arm 16 has its center coincident with the axis of the shaft 46. Consequently, after the arm 16 has been moved to this position, any further rotation of the shaft 46 will only cause the roller 48 to travel around the arcuate portion 50 without imparting any movement to the arm 16. This permits of using the further rotation of the shaft for operating the shearing blade through the following mechanism: The gear wheel 45 drives a gear wheel 52 on a shaft 53, which latter also extends adjacent to the plane of movement of the arm 16. An eccentric 54 on this shaft (Fig. 10) has a screw-threaded engagement with a rod 55 which, at its lower end, has a universal pivotal engagement 56 with a rock arm 57 fulcrumed on a pivot 58. This rock arm is so arranged that in the last mentioned position of the arm 16 it will bear against the outer end of the cut-off blade F. Consequently, while the arm 16 remains stationary, the further rotation of the shafts 46 and 53 will rock the arm 57 to press the blade F downward, so as to sever the roll segment of the strip and permit the bearing to drop off the mandrel. A stop 59 engages a spring-pressed plunger 60 on the arm 57 so as to hold the latter in its normal position, while at the same time permitting the rocking movement under actuation of the rod 55. To adjust the operation of the blade F for mandrels of different diameters the rod 55 is screwed up or down in the eccentric 54 to correspondingly adjust the movement of the blade.

*Strip feeding mechanism*

Figure 13:
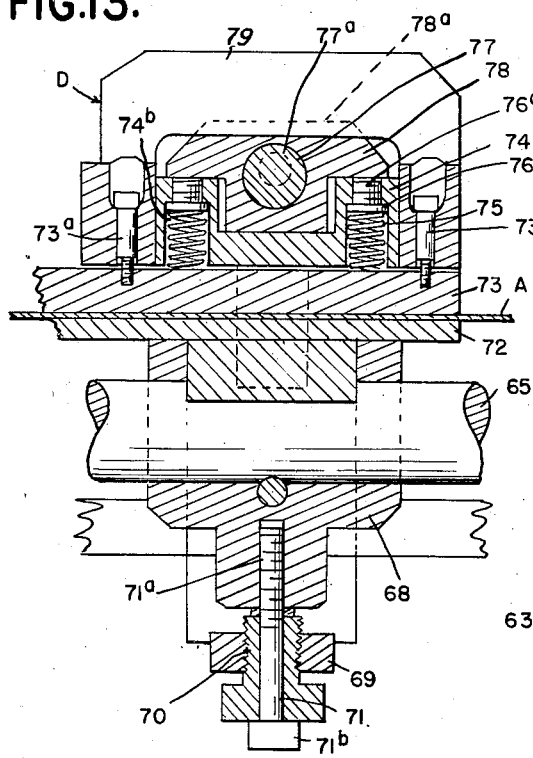
Figure 13 is an enlarged section through the strip advancing mechanism.
Figure 14:
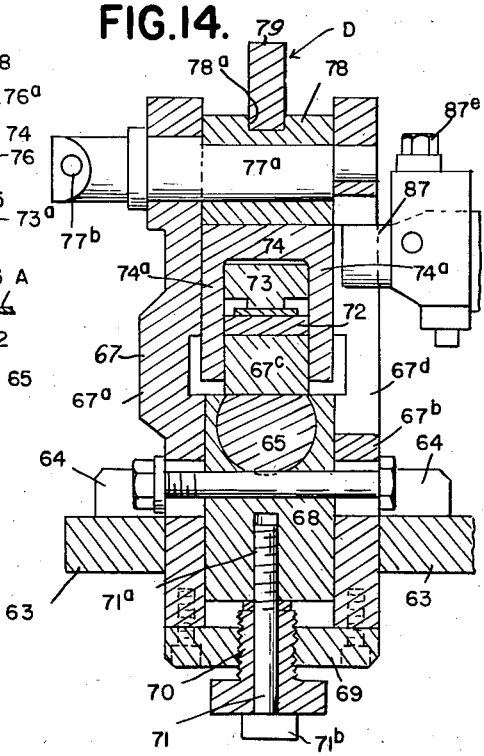
Figure 14 is a transverse section therethrough.

Before the rolling and cut-off mechanisms can function, the strip A must be advanced over the mandrel a predetermined distance corresponding to the arcuate length of the rolled bearing. As bearings of various dimensions are to be rolled the mandrels must be exchanged, and with such exchanges, the radial distance from the axis is altered. However, it is necessary that the strip should always be advanced in a plane tangent to the mandrel, which requires adjustment in the plane of feed for each change of mandrel. The feed mechanism therefor comprises: First, the means for periodically advancing the strip a predetermined length. Second, means for adjusting the strip advancing means to change the length; and third, means for raising or lowering the plane of feed, the construction being as follows:

The frame 3ᵇ (Fig. 7) which supports the feeding mechanism is located adjacent to one end of the main frame 1, and comprises (Figs. 13 and 14) a substantially rectangular base member 61 having upwardly extending posts 62 at the four corners thereof. 63 are parallel guide bars mounted on these posts and extending longitudinally of the frame. 64 are cross heads mounted at the opposite ends of the guide members 63 and centrally apertured for the passage therethrough of a cylindrical slide 65. Bushings 66 form bearings for this slide and hold the same in parallelism with the guide bars 63. Mounted on the slide 65 is a carriage including a substantially H-shaped member 67 having parallel sides 67ᵃ, 67ᵇ, and a central connecting cross bar 67ᶜ. Below this cross bar and fitting between the sides 67ᵃ and 67ᵇ is a head 68, which is apertured for the passage of the slide 65, and is secured thereto. A cross bar 69 extends between the sides 67ᵃ and 67ᵇ at the lower ends thereof, and this bar has a central aperture which is threaded to receive an adjusting screw 70. The screw 70 has an axial bore through which passes a smaller rod 71, the latter having a threaded portion 71ᵃ at its upper end for engaging a correspondingly threaded aperture in the member 68, while at its lower end it has a polygonal head 71ᵇ. Above the cross bar 67ᶜ are cooperating clamping plates 72 and 73 adapted to frictionally grip the strip A when extended therebetween. These plates are coupled to the member 67, so as to move longitudinally therewith, by a head member 74 which fits between the sides 67ᵃ and 67ᵇ, and is provided with downwardly extending parallel guide bars 74ᵃ which pass through aligned channels in the cross bar 67ᶜ and clamping plates 72 and 73. The member 74 has a plurality of recesses 74ᵇ therein for receiving springs 75. These springs at their lower ends, bear against the clamping plate 73, while at their upper ends they engage the heads 76 of adjusting screws 76ᵃ, having a threaded engagement with the member 74. A shaft 77 journaled in bearings at the upper ends of the sides 67ᵃ and 67ᵇ is provided with an eccentric portion 77ᵃ between said sides which engages a member 78 bearing against the member 74. This member 78 has a groove 78ᵃ in its upper face which engages an inverted U-shaped yoke member 79, the opposite ends of which are loosely connected with the clamping plate 73 by bolts 73ᵃ. A lever arm 77ᵇ projecting from one end of the shaft 77 provides means for rotating the same, and the arrangement is such that when the eccentric portion is moved upward, it will lift the member 78, and through the connecting yoke 79, will lift with it the upper clamping plate 73, thereby providing clearance for the insertion of the strip A between this plate and the lower clamping plate 72. On the other hand, when the lever is actuated to turn the eccentric downward, the plate 73 will be moved against the strip A under the resilient tension of the springs 75. The loose connection between the yoke and the plate 73 afforded by the bolts 73ᵃ permits a slight relative movement between this plate and the yoke, so that the pressure of the plate against the strip is that determined by the tension of the springs. This tension may be altered by adjusting the screws 76ᵃ upward or downward in the threaded bearings in the member 74.

The yoke 79 has projecting from one end thereof the cross member 79ᵃ, providing in its opposite end portions a pair of split clamping bearings for vertically extending shafts 80. These shafts have at their lower ends eccentric vertically extending pins 80ᵃ on which are journaled rollers 80ᵇ, the latter being arranged to cross the plane of the strip A. Milled heads 80ᶜ at the upper ends of these shafts provide a means for rotatably adjusting the same when the clamping bearings 80ᵈ are released, and such adjustment permits of variously arranging the rollers 80ᵇ to form edge guides for the strips. Thus the rollers may be adjusted to correspond to different widths of strips, or they may be adjusted to one side or the other to correspondingly change the path of movement of said strips.

*Actuating mechanism for the strip feeding means*

Figure 15:
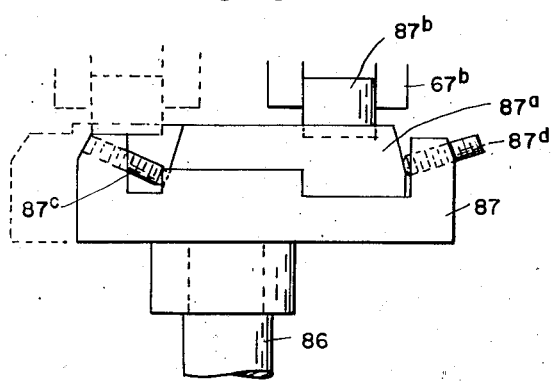
Figure 15 is a plan view of the adjustable throw crank for actuating the strip advancing mechanism.
Figure 23:
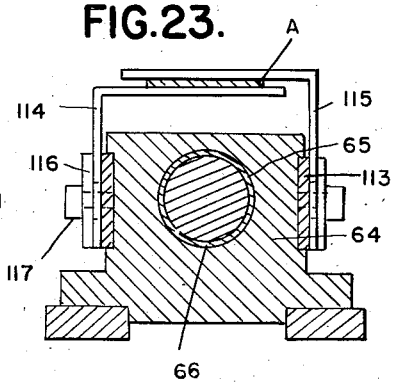
Figure 23 is a cross section on line 23—23, Figure 7, showing the strip supporting guide.

Actuated by the shaft 30, previously referred to, is a cam mechanism similar to that described in connection with the rolling and cut-off mechanisms (Fig. 22). This cam mechanism includes a pair of cams 81 and 81ᵃ. A rocker 82 with angularly extending arms 82ᵃ and 82ᵇ carries rollers 82ᶜ for engaging said cams. A pin 82ᵈ on said rocker is connected by a rod 83 with a sector gear 84. This sector gear is in mesh with a gear wheel 85, and the ratio is such that the gear wheel 85 will be given one-half revolution. The gear wheel 85 is on a shaft 86 which extends into proximity to the longitudinal plane of the side 67$^b$ of the H-shaped member 67. A head 87 (Figs. 14 and 15) mounted on the shaft 86 is provided with a radially adjustable head 87$^a$ on which is mounted a roller 87$^b$. Adjusting screws 87$^c$ and 87$^d$ at opposite ends of the head 87 may be manipulated to change the position of the head 87$^a$ with respect to the axis of the shaft 86, thereby enlarging or diminishing the radial length between this axis and the axis of the roller 87$^b$. A clamping bolt 87$^e$ holds the parts in rigid relation after such adjustment. The roller 87$^b$ engages a vertically extending slot 67$^d$ in the side 67$^b$. This slot is of sufficient length both for the movement of the roller 180° about the axis of the shaft 86 and also for any vertical adjustment of the member 67 for changing the plane of feed.

In the operation of this actuating mechanism, the roller 87$^b$ normally stands in the horizontal plane of the axis of the shaft 86, and as this shaft is given one-half revolution by its gear wheel 85 and sector gear 84, the axis of the roller will again be in the same horizontal plane at the completion of its movement. Thus the length of movement which is imparted to the feed carriage (as shown in dotted lines in Figure 15) is always twice the radial distance between the axes of the shaft 86 and the roller 87$^b$. This radial length may be changed by adjustment of the screws 87$^c$ and 87$^d$, and consequently any desired degree of longitudinal movement may be imparted to the carriage.

*Clamping and piercing mechanisms*

The forward advancement of the strip A is effected by the frictional engagement therewith of the plates 72 and 73. It is then necessary to clamp the strip against any movement while the feeder is returning to its initial position. Such clamping is effected by cooperating clamping plates which, however, must be vertically adjusted into the plane of feed whenever different mandrels are used. The piercing operation is performed while the strip is clamped, and this also must be capable of vertical adjustment to correspond to changes in the plane of feed, the construction being as follows:

Mounted on the bed or table 2 in advance of the frame 3$^b$, but in rear of the frame 3, is a frame 3$^a$ (Figs. 7, 16, 17 and 18). This includes a base portion 88 similar to the base portion 61 of the strip feeding mechanism and a pair of longitudinally extending parallel spaced guide rails 88$^a$ and 88$^b$. 89 is a plate member which has a depending portion 89$^a$ extending between the guide rails 88$^a$ and 88$^b$ and vertically adjustable in relation thereto. The bottom of the portion 89$^a$ is obliquely inclined to engage the surface of a pair of wedge members 90 which extend transversely of the frame 88, and are slidable in guide bearings therein. Each wedge 90 has its lower surface formed as a rack 90$^a$ which is in mesh with a gear wheel 90$^b$ on a shaft 90$^c$ journaled in bearings in the frame 88. Thus when the shaft 90$^c$ is revolved, it will simultaneously move the wedges 90 to raise or lower the member 89. The member 89 is also longitudinally adjustable in relation to the member 88 and guideways 88$^a$ and 88$^b$, and is further provided with means for clamping it in rigid position after vertical or longitudinal adjustment.

Such means comprises a member 91 (Fig. 24) which engages a central longitudinally extending channel in the portion 89$^a$. The member 91 has an enlarged head 91$^a$ engaging a corresponding enlargement in the channel, and the projecting portions form shoulders 91$^b$ engaging corresponding shoulders 89$^d$ on the member 89. 92 is a screw-threaded rod engaging a corresponding threaded socket in the member 91 and depending therefrom to pass through an aperture in the frame member 88. The lower end portion of this rod is also threaded for the engagement of a clamping nut 92$^a$, by means of which clamping pressure may be exerted on the member 91, and through the shoulders 89$^d$ and 91$^b$ will transmit the pressure to the wedges 90. This will hold the plate 89 in rigid position after vertical adjustment of the same.

For longitudinal adjustment of the plate 89 the member 91 is provided with an upwardly extending ear 91$^c$, through which is passed a longitudinally extending rod 93. The forward end of this rod has a threaded engagement with the member 89 while the rear end portion is also threaded for the engagement of clamping nuts 93$^a$ and 93$^b$ respectively upon opposite sides of said ear. Thus whenever it is desired to adjust the member 89 longitudinally with respect to the frame member 88, one of the nuts 93$^a$, 93$^b$ is moved away from the ear 91$^c$ on the rod 93, and the other nut is adjusted to move said rod and the member 89 the desired amount. Such adjustment is, of course, effected when the clamping pressure by the screw 92 is released, and after adjustment the parts may be rigidly locked in position. To further guard against lack of rigidity, one of the wedges 90 is locked against movement, preferably by a screw-threaded rod 94 engaging a threaded aperture in the member 91 and extending into clamping engagement with the wedge.

Supported upon the plate 89 is a member 95 which is transversely adjustable thereon. A key 95$^a$ connecting the members 89 and 95 directs this transverse adjustment at right angles to the longitudinal adjustment of the member 89 with respect to the member 88. The adjustment means comprises a bracket member 96 bolted to the side of the member 89 and having an upwardly extending ear 96$^a$. This ear is apertured for the passage of a rod 96$^b$, which at its inner end is connected to the member 95 while its outer end portion is threaded for engagement of nuts 96$^c$ and 96$^d$ on opposite sides of the ear 96$^a$. Thus by adjusting these nuts, the member 95 may be moved laterally on the member 89 and can be locked in this adjusted position.

The upper face of the member 95 supports the strip A when advanced by the feed mechanism, and after proper vertical adjustment will be in a plane which is tangent to the mandrel. A hardened plate 95$^b$ engages a recess in the upper face of the member 95 and forms a direct support for the strip A. Above the member 95 and at the forward end portion thereof, in the direction of advancement of the strip, is a clamping plate 97. This member is vertically movably secured in a recess in a head member 97$^a$ which is mounted on the member 95 to extend transversely thereof. The member 97$^a$ is also apertured to receive an annular member 98 which has a series of pockets therein for receiving springs 98$^a$ that bear downward upon the clamping plate 97. These springs are of sufficient tension to hold the strip A from any movement when clamping pressure is applied. However, clamping pressure may be relieved by the lifting of the plate 97 by means that will be later described. Exchangeable punch and die holding members 89 and 99a are detachably secured respectively in the member 98 and the member 95, so as to be in registration with each other. Also, the clamping plate 97 is apertured for the passage of the punch or punches therethrough into engagement with their registering dies.

The clamping of the strip A by the plate 97 must be timed so as to permit the free advancement of the strip by the feed mechanism, but to hold it stationary during the operation of the rolling and cut-off mechanisms. I therefore provide means for lifting the plate 97, which is of the following construction:

The member 95 is provided on opposite sides of the portion supporting the strip A with longitudinally extending bores 95c (Figs. 19, 20 and 21) which receive slidable rods 100. On top of the member 95 is a guideway for a longitudinally movable slide 101, and this slide is connected through the medium of a coupler member 102 with the rear ends of the rods 100. The portion of the rods 100 which are beneath the clamping plate 97 have cammed or wedge shaped upper faces 100a. These, when the rods are drawn rearward, engage the lower ends of members 100b which are located in vertically extending recesses in the member 95, with their upper ends bearing against the plate 97. Thus whenever the rods 100 are drawn rearward, the members 100b will raise the clamping plate 97 against the tension of the springs 98a. On the other hand, when the rods 100 are moved forward, the cams will release the members 100b and permit the springs to force the clamping plate 97 into engagement with the strip.

The slide 101 at its forward end is coupled by a toggle link 103 with a lever 103a, which is fulcrumed upon a pin 103b in a bracket 103c mounted on the member 97a. The forward end of the lever 103a bears upon an upwardly extending shank 99b of the punch holding member 99, which latter is normally held in raised position by the tension of the springs 98a. However, when the slide 101 is moved forward the toggle link 103 will tilt the lever 103a, thereby depressing the shank 99b and causing the punch to pierce the strip A which is held in registration therewith. There is sufficient movement imparted to the rods 100 in advance of the operation of the punch so that the wedges 100a will be withdrawn from the members 100b, thereby allowing the plate 97 to clamp the work.

*Actuating and timing means for the clamping and piercing mechanisms*

The shaft 29 has connected thereto a cam 104 (Fig. 22) which actuates a rocker 104a, and this rocker is connected by a rod 105 with a rock arm 106 on a shaft 107 (Figs. 16 and 17). This shaft extends over the slide 101 and has attached thereto a depending rock arm 107a carrying a roller 107b (Figs. 16 and 17). This roller is in engagement with a vertically extending groove 108 in a bracket member 108a which is mounted on the slide 101 to extend upward therefrom. The arrangement is such that the rocking of the depending arm 107a will, through the roller 107b, transmit longitudinal movement to the member 108a, and through the latter to the slide 101. Thus the fashioning of the cam 104 will determine the timing of the rocking movement imparted to the shaft 107, and consequently the timing of the operation of the clamping and piercing mechanisms.

*Adjustment of the piercing mechanism*

As has already been described, the member 89 is adjustable longitudinally and the member 95 is adjustable transversely in relation to the supporting frame member 88. The purpose of these adjustments is to properly position the punch and die members in relation to the mandrel, so that the pierced apertures in the strip will be properly positioned in the finished bearing. Inasmuch, however, as the member 108a is mounted on the slide 101, any longitudinal adjustment would change the relation between the rock arm 107a and said member 108a, which would alter the operation of the piercing and clamping mechanisms. To avoid such result, the member 108a is longitudinally adjustably secured to the slide 101 by means of clamping bolts 109 passing through longitudinal slots 109a in said member. It is therefore only necessary to loosen these clamping bolts when any longitudinal adjustment is made of the member 89 and to again clamp the bolts when the adjustment is completed. The transverse adjustment of the member 95 does not alter the function of the rock arm 107a as the roll 107b can be shifted in position in the slot 108 without changing the operation.

*Operation*

To prepare the machine for the forming of a bearing of any desired dimension, a mandrel B of proper size is first selected, and engaged with the holder therefor. This operation is facilitated by the use of handle member 110, which can be attached to the end of the selected mandrel by bolts 111. This handle is also provided with a locking finger 112 which engages a recess in the sleeve member 12 to properly position the mandrel in relation thereto and to hold it in this position. The feed mechanism and the clamping and piercing mechanisms must then be vertically adjusted to bring the plane of feed tangent to the selected mandrel. For so adjusting the feed mechanism the screw-threaded rod 71 is released and the screw 70 is adjusted to raise or lower the member 67 with respect to the member 68. The screw 71 is then tightened to clamp the parts in this position. As the member 67 carries the clamping plates 72 and 73, these will be positioned at the proper height for the plane of feed. The shafts 80 are then adjusted to properly position the rollers 80b so that they will guide the opposite edges of the strip A during its passage between said clamping plates. There is also preferably provided a supporting guide for the strip A intermediate the feeding mechanism and the clamping and piercing mechanisms. This comprises arms 113 which project forward from the opposite side of the forward cross head 64 and have mounted thereon the angle members 114 and 115. The vertical portions of said angle members are clamped to the members 113 by clamping plates 116 and screws 117, which latter pass through slots in said vertical portions. The horizontal portions overlap each other, and by said vertical adjustment may be positioned to be respectively above and below the strip A.

The amount of advancement of the strip during each feeding operation must correspond to the arcuate length of the formed bearing segment. This is accomplished by adjusting the screws 87ᶜ and 87ᵈ so as to shift the head 87ᵃ to either increase or diminish the radial distance of the axis of the roller 87ᵇ from the axis of the shaft 86.

The vertical adjustment of the clamping and piercing mechanisms is accomplished by rotating the shaft 90ᶜ, which, through the gear wheels 90ᵇ, move the racks 90ᵃ of the wedge members 90, and these will raise or lower the member 89. However, before making such adjustment the nut 92ᵃ on the screw 92 must be released and later tightened to hold the parts rigid. The piercing mechanism must also be adjusted to properly locate the pierced aperture or apertures in the bearing. Such adjustment is performed either by moving the member 89 longitudinally, or the member 95 laterally, or both. The longitudinal movement is accomplished by adjustment of the nuts 93ᵃ and 93ᵇ on the rod 93. The lateral adjustment is by rotating the screw 96ᵇ which moves the member 95 on the member 89, and after such adjustment the lock nuts 96ᶜ and 96ᵈ are tightened to hold the parts in such position. If the member 89 is adjusted longitudinally, the member 108ᵃ must be unclamped from the slide 91 so that this member may remain in proper relation to the rock arm 107ᵃ. The member 108ᵃ is then again clamped to the slide.

After completing the adjustments as above, the operator raises the clamping plate 73 by means of the lever 77ᵇ which rotates the shaft 77 and eccentric portion 77ᵃ, thereby lifting the yoke 79 attached to said clamping plate. This provides space between the plates 73 and 72 for the insertion of the strip A, which is also passed through the clamping mechanism and onward to the mandrel. The lever 77ᵇ is then manipulated to lower the plate 73, which will frictionally grip the strip under the tension of the springs 75. The machine is now ready for operation, and is started by the lever 27 which throws in the clutch 26 and communicates rotary movement to the shaft 25. This shaft in turn communicates its motion through the speed reduction gearing to the shaft 28, and from the latter the shafts 29 and 30 are driven through the sprocket and chain transmission, so that all of these shafts are constantly rotating at the same angular speed. The timing of the operations in proper sequence is through the cams on the respective shafts 28, 29 and 30. At the beginning of the cycle the strip A is advanced by the feed mechanism so as to extend over and beyond the mandrel B the required amount for forming one bearing. The rolling mechanism then operates to roll the strip about the mandrel, at the same time radially compressing the metal and circumferentially elongating the outer face portion thereof, so as to compensate for angular deflection and to relieve internal stresses. Such movement is effected by the rotation of the shaft 6 to which the arm 17 is attached. The roller will pass beyond the end of the rolled portion of the strip so as to free the latter after it is severed from the remainder of the strip. The roll will remain in this position during the operation of the cut-off mechanism, which includes the partial rotation of the mandrel and the operation of the severing blade. The rotation of the mandrel is accomplished by the swinging of the arm 49 under the actuation of the shaft 46 (Figs. 10 and 11). This, through the cooperation of the roller 48 with the cam track 47, will turn the arm 16 from the position shown in Figures 1 to 3 into the position shown in Figure 4. At the completion of this swinging movement the arcuate portion 50 of the cam track 47 will be concentric with the axis of the shaft 46, so that further rotation of the shaft and movement of the arm 49 will not change the position of the arm 16. However, during such continued movement the shaft 53 will operate the eccentric 54 so as to move the rod 55 and through it swing the arm 56 so as to actuate the severing blade F in a radially inward direction. This blade in cooperation with the blade G will sever the strip and permit the formed bearing to drop off from the mandrel. During the operation of the rolling and severing mechanisms the portion of the strip which passes beneath the plate 97 will be clamped thereby with sufficient force to hold it rigid. While thus clamped, the feeding mechanism will be returned to its initial position as the friction of the plates 72 and 73 on the strip A is not sufficient to move it against the clamping pressure of the plate 97. Before the cycle is completed and the feeding mechanism is again actuated in a forward direction, the slide 101 will be moved rearward under the actuation of the crank arm 107ᵃ and roller 107ᵇ which engages the member 108ᵃ. This will impart similar rearward movement to the rods 100, the wedges 100ᵃ of which raise the members 100ᵇ and clamping plate 97. The piercing may be accomplished any time during the period in which the strip is clamped by the plate 97, this being effected by the forward movement of the slide 101, the toggle link 103 and lever 103ᵃ, which latter depresses the punch carrying member.

What I claim as my invention is:

1. In a machine for forming arcuate bearings from flat strips, an exchangeable mandrel, strip rolling means associated with said mandrel, reciprocating means frictionally engaging a flat portion of said strip for advancing the same in relation to said mandrel, means for adjusting the amplitude of movement of said reciprocating means and the length of advancement of the strip thereby to correspond to the size of said mandrel, and means intermediate said strip advancing means and mandrel for clamping and holding said strip stationary against the return pull of said reciprocating means while operated upon by said rolling means.

2. In a machine for forming arcuate bearings from flat strips, an exchangeable mandrel, strip rolling means associated with said mandrel, reciprocating means frictionally engaging the flat strip for advancing the same in relation to said mandrel, means intermediate said strip advancing means and mandrel for holding the strip stationary while operated upon by said rolling means, and means for vertically adjusting said strip advancing means and strip holding means into a plane tangent to the exchangeable mandrel.

3. In a machine for forming arcuate bearings from flat strips, a mandrel, means for advancing the flat strip in a plane tangent to the mandrel to project an end portion of predetermined length beyond the line of tangency, means for holding stationary the portion of the strip in rear of the line of tangency, a member mounted to swing about the axis of said mandrel concentric therewith, a roller carried by said member adapted to roll the projected portion of said strip about and in conformity to said mandrel, and means for severing a rolled arcuate portion of said strip from the remainder thereof.

4. In a machine for forming arcuate bearings from flat strips, a rigid mounting for mandrels of different diameters, an exchangeable mandrel in said mounting, means for advancing a flat strip to project an end portion thereof beyond said mandrel, means for adjusting the plane of said strip advancing means to be tangent to said mandrel, means for adjusting the length of advancement to be proportional to the diameter of the mandrel, a member mounted to swing about said mandrel mounting concentric with the axis thereof, a roller carried by said member, means for radially adjusting said roller into operative relation to the strip on said mandrel, means for actuating said member to roll the projected portion of said strip about and in conformity to said mandrel, and means for severing a rolled arcuate portion of said strip from the remainder thereof.

5. In a machine for forming arcuate bearings from flat strips, a rigid mounting for exchangeable mandrels of different diameters, means for advancing a flat strip in a plane tangent to the particular mandrel in said mounting to project an end portion of said strip beyond the line of tangency, means for adjusting the plane of advancement to correspond to mandrels of different diameters, means for adjusting the length of advancement to be proportional to the diameter of the mandrel, a member mounted to swing about said mandrel mounting concentric with the axis thereof, and a roller carried by said member radially adjustable into operative relation to the particular mandrel, and adapted to apply radially inward circumferentially advancing pressure to the projecting portion of said strip to conform the same to the mandrel.

6. In a machine for forming arcuate bearings from flat strips, a rigid mounting for exchangeable mandrels of different diameters, means for advancing a flat strip in a plane tangent to the particular mandrel in said mounting to project an end portion of said strip beyond the line of tangency, means for adjusting the plane of advancement to correspond to mandrels of different diameters, means for adjusting the length of advancement to be proportional to the diameter of the mandrel, a member mounted to swing about said mandrel mounting concentric with the axis thereof, a roller carried by said member radially adjustable into operative relation to the particular mandrel, and adapted to apply radially inward circumferentially advancing pressure to the projecting portion of said strip to conform the same to the mandrel, and means for severing a rolled arcuate portion of said strip from the remainder thereof.

7. In a machine for forming arcuate bearings from flat strips, a mandrel, means for periodically advancing the flat strip in a plane tangent to said mandrel to project an end portion of said strip a predetermined length beyond the line of tangency, means operating intermediate successive advancement of said strip for holding stationary the portion of the strip in rear of the line of tangency, a member mounted to swing about the axis of said mandrel concentric thereto operating while said strip is held, a roller carried by said member adapted to apply radially inward circumferentially advancing pressure to the projecting portion of said strip to conform the same to said mandrel, and means for severing a rolled portion of said strip from the remainder thereof.

8. In a machine for forming arcuate bearings from flat strips, a mandrel, means for advancing the flat strip in a plane tangent to said mandrel to project an end portion of predetermined length beyond the line of tangency, a member mounted to swing about the axis of said mandrel, a roller carried by said member, a mounting for said roller radially adjustable on said member and adapted to hold the axis of the roller a predetermined distance from the axis of the mandrel during the swinging of said member in one direction, said mounting permitting a movement of the axis of the roller away from the axis of the mandrel during the return swinging of said member in the opposite direction.

9. In a machine for forming arcuate bearings from flat strips, a mandrel, means for advancing the flat strip in a plane tangent to the mandrel to project an end portion of predetermined length beyond the line of tangency, a member mounted to swing about the axis of said mandrel, a head secured to said member to be adjustable towards or from said mandrel, a roller, a mounting for said roller pivotally connected to said head, a stop for holding said mounting against movement on its pivot during the swinging of said member in one direction about said mandrel but permitting movement on said pivot during the swinging of said member in the opposite direction, and yieldable resilient means for normally holding said mounting in engagement with said stop.

10. In a machine for forming arcuate bearings from flat strips, the combination with a mounting for mandrels of different diameters, an exchangeable mandrel therein, a member mounted to swing about the axis of said mandrel concentric therewith, and a roller carried by said member radially adjustable towards or from the axis of said mandrel, of means for advancing the flat strip to said mandrel comprising a reciprocatory carriage, a head mounted on said carriage, a pair of clamping pads mounted on said head and adapted to engage the strip to be advanced, means for resiliently pressing one of said pads towards the other, and means for vertically adjusting said head on said carriage to place said pads in a plane tangent to the mandrel.

11. In a machine for forming arcuate bearings from flat strips, the combination of spaced axially aligned bearings, a shaft journaled in one of said bearings, a bushing in the other of said bearings projecting inward therefrom, a bifurcated member between said bearings having one of the furcations thereof non-rotatably secured to said shaft and the other furcation rotatably engaging said bushing, an exchangeable mandrel insertable through said bushing bridging the space between the furcations of said member, a roller mounted on said member radially adjustable with respect to said mandrel, means for feeding the flat strip between said mandrel and roller tangent to the former, and with its end portion projecting a predetermined length beyond the line of tangency, and means for rotating said shaft to roll the projected portion of said strip about and in conformity to said mandrel.

12. In a machine for forming arcuate bearings from flat strips, the combination of spaced axially aligned bearings, a shaft journaled in one of said bearings, a hollow trunnion journaled in the other of said bearings, a pair of bifurcated arms between said bearings with the furcations of one embracing those of the other, one of the inner furcations being non-rotatably secured to said shaft and one of the outer furcations being non-rotatably secured to said hollow trunnion, an exchangeable mandrel insertable through said hollow trunnion to bridge the space between the furcations of the inner arm and have a stepped rotative engagement with said shaft, a roller carried by said inner arm radially adjustable with respect to said mandrel, means for advancing the flat strip between said mandrel and roller to project an end portion of the strip a predetermined length beyond the line of tangency with the mandrel, a severing blade mounted on the outer arm, a cooperating severing blade in a recess in said mandrel, said blades bing normally positioned in rear of the line of tangency of said strip to said mandrel to leave an uninterrupted surface on said mandrel forward of said line of tangency, means for rotating said shaft to roll the projected portion of said strip around said mandrel in conformity thereto, operating means for rotatably adjusting said outer arm to move said cooperating blades into a position opposite a rolled segment of said strip, and means for actuating said outer blade radially inward while in the latter position.

13. In a machine for forming arcuate bearings from flat strips, a mandrel, strip rolling means associated with said mandrel, means for advancing the flat strip in relation to said mandrel, means for adjusting the length of advancement by said strip advancing means, means intermediate said strip advancing means and said mandrel for holding the strip stationary while operated upon by said rolling means to form an arcuate bearing, and means for severing said arcuate bearing from the remainder of the strip.

14. In a machine for forming arcuate bearings from flat strips, the combination of a holder for a mandrel, rolling mechanism mounted to swing through an arcuate path concentric with the axis of said holder, a mandrel in said holder having an uninterrupted arcuate peripheral segment opposite the arcuate path of said rolling mechanism, and also having a groove segment, means for inserting a flat strip between said mandrel and rolling mechanism, a severing means for said strip in registration with said groove segment, means for operating said rolling mechanism to conform said strip to said mandrel, and subsequently operating means for rotating said mandrel and severing means into a position for severing a rolled segment of said strip.

15. In a machine for forming arcuate bearings from flat strips, the combination of a holder for a mandrel, rolling mechanism mounted to swing through an arcuate path concentric with the axis of said holder, a mandrel in said holder having an uninterrupted arcuate peripheral segment opposite the arcuate path of said rolling mechanism, and also having a groove segment and a shearing blade in the groove, means for inserting a flat strip between said mandrel and rolling mechanism, a severing means including a cooperating shearing blade in registration with the shearing blade in said mandrel, means for operating said rolling means to conform said strip to said mandrel, subsequently operating means for rotating said mandrel and severing blades into a position for severing a rolled segment, and means for moving the cooperating blade radially inward while in such position to sever a complete bearing from the remainder of the strip.

16. In a machine of the character described, means for periodically advancing a flat strip in a selected plane, comprising a reciprocatory carriage, a head vertically adjustably mounted on said carriage, a pair of clamping pads mounted on said head and embracing the strip to be fed, resilient means for pressing said pads against said strip with a predetermined friction, a crank arm normally extending horizontally, a roller on said arm engaging a slot in said head, means for rotating said crank arm through substantially 180° to advance said carriage, and means for adjusting the radial distance between the axis of said roller and the axis of said crank to change the distance of advancement.

17. In a machine of the character described, means for advancing a flat strip in a selected plane, comprising a reciprocatory carriage, a head vertically adjustably mounted on said carriage, a pair of pads mounted on said head and adapted to embrace therebetween the strip to be fed, resilient means for pressing the upper pad against said strip, a yoke connected to said upper pad, an eccentric for raising said yoke and upper pad against the resistance of said resilient means to provide clearance for the insertion of the strip between said pads, a crank arm normally extending in a horizontal plane, a roller on said crank arm engaging a vertically extending slot in said head, means for reciprocating said crank arm through substantially 180°, with a dwell at each end of its movement, to impart a similar reciprocation and dwell to said carriage, and means for adjusting the radial distance between the axes of said roller and crank arm to change the amplitude of reciprocation.

18. In a machine for forming arcuate bearings from flat strips, the combination of spaced axially aligned bearings, a shaft journaled in one of said bearings, a bushing in the other of said bearings projecting inward therefrom, a bifurcated member between said bearings having one of the furcations thereof non-rotatably secured to said shaft and the other furcation rotatably engaging said bushing, an exchangeable mandrel insertable through said bushing bridging the space between the furcations of said member and having a stepped rotative engagement with said shaft, a head mounted on said member, a roller journaled on said head, means for adjusting said head on said member to move said roller towards or from the axis of said mandrel, means for feeding a flat strip between said mandrel and roller tangent to the former and with its end portion projecting a predetermined length beyond the line of tangency, means for rotating said shaft to roll the projected portion of said strip about and in conformity to said mandrel, and means for severing an arcuate rolled segment of said strip from the remainder thereof.

19. In a machine of the character described, the combination with a mandrel and associated means for periodically advancing a strip thereto and for rolling said strip about said mandrel, of a plate over which said strip is advanced, cooperating punch and die members mounted on said plate, a resiliently pressed clamping pad adjacent to said plate, means for alternately lifting and releasing said clamping pad to respectively permit advancement of said strip and for holding the same from movement, means operating when said pad is released for actuating said punch member to pierce said strip, a bed on which said plate is mounted, means for adjusting said plate on said bed in transverse directions to locate the piercing of the strip in predetermined relation to said mandrel, and means for raising or lowering said plate on said bed to bring the plane of the strip thereon tangent to the mandrel.

WAYNE W. PATTISON.